United States Patent

Steinfield et al.

(10) Patent No.: US 7,027,157 B2
(45) Date of Patent: Apr. 11, 2006

(54) CALIBRATING A FIRST COLOR PRINTING TECHNOLOGY BASED ON COLOR DIFFERENCES WITH A SECOND COLOR PRINTING TECHNOLOGY

(75) Inventors: Steve Steinfield, San Diego, CA (US); James Kelley, Allen, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 310 days.

(21) Appl. No.: 10/623,411

(22) Filed: Jul. 18, 2003

(65) Prior Publication Data

US 2005/0012930 A1    Jan. 20, 2005

(51) Int. Cl.
*G01J 3/50* (2006.01)

(52) U.S. Cl. ................... 356/425; 358/518

(58) Field of Classification Search ............ 356/425
See application file for complete search history.

(56) References Cited

U.S. PATENT DOCUMENTS 5,333,069 A * 7/1994 Spence .................. 358/517
6,157,735 A   12/2000 Holub

* cited by examiner

*Primary Examiner*—F. L. Evans (57) ABSTRACT

A method of an embodiment of the invention is disclosed that outputs a first color calibration target using a first color printing technology onto media that has a second color calibration target already output thereon using a second color printing technology. The color differences between the first and the second color calibration targets are determined. The first color printing technology is calibrated, based on the color differences between the first and the second color calibration targets.

42 Claims, 4 Drawing Sheets

CALIBRATING A FIRST COLOR PRINTING TECHNOLOGY BASED ON COLOR DIFFERENCES WITH A SECOND COLOR PRINTING TECHNOLOGY

BACKGROUND

Occasionally different printing technologies are used to print on the same media. For example, business stationery, such as letterhead, may be printed on a bulk basis using a commercial, high-speed printing technology, such as offset analog press technology. When a particular piece of the stationery is then used, another printing technology may be employed, such as an inkjet printer or a laser printer. The information that does not change between print jobs, such as a company's name and address, is likely printed using the former printing technology, whereas information that is specific to a print job, such as the substance of a letter, is usually printed using the latter printing technology.

Many times the colors that are printed with one printing technology are desirably matched when printing with another printing technology. For example, the letterhead media that is printing with a high-speed offset printing technology may have a company logo printed in a particular color. When printing on a piece of letterhead using another printing technology, such as inkjet technology, the letter writer's name may be desired to be printed in the same color. The output of color by the inkjet printing device should match the color previously output by the high-speed offset printing device, so that, for instance, the letter recipient cannot discern that two different printing technologies were used to print on the media.

However, color matching between printing technologies can be difficult. Spot colors printed by analog printing technologies may result from specially mixed inks, and may exceed the color gamut of process colors printed by digital printing technologies, such as inkjet printers, that rely upon combining base colors to achieve a desired color. For instance, inkjet printers use a limited selection of color inks, such as cyan, magenta, yellow, and black, to yield other colors by combination. Even if a particular spot color has a mapped process color, differences in how the printing technologies print on specific media, as well as other factors, can cause visible color differences between the spot and the process colors.

SUMMARY

A method of an embodiment of the invention outputs a first color calibration target using a first color printing technology onto media that has a second color calibration target already output thereon using a second color printing technology. The color differences between the first and the second color calibration targets are determined. The first color printing technology is calibrated, based on the color differences between the first and the second color calibration targets.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Overview of Color Matching Different Color Printing Technologies

Figure 1:
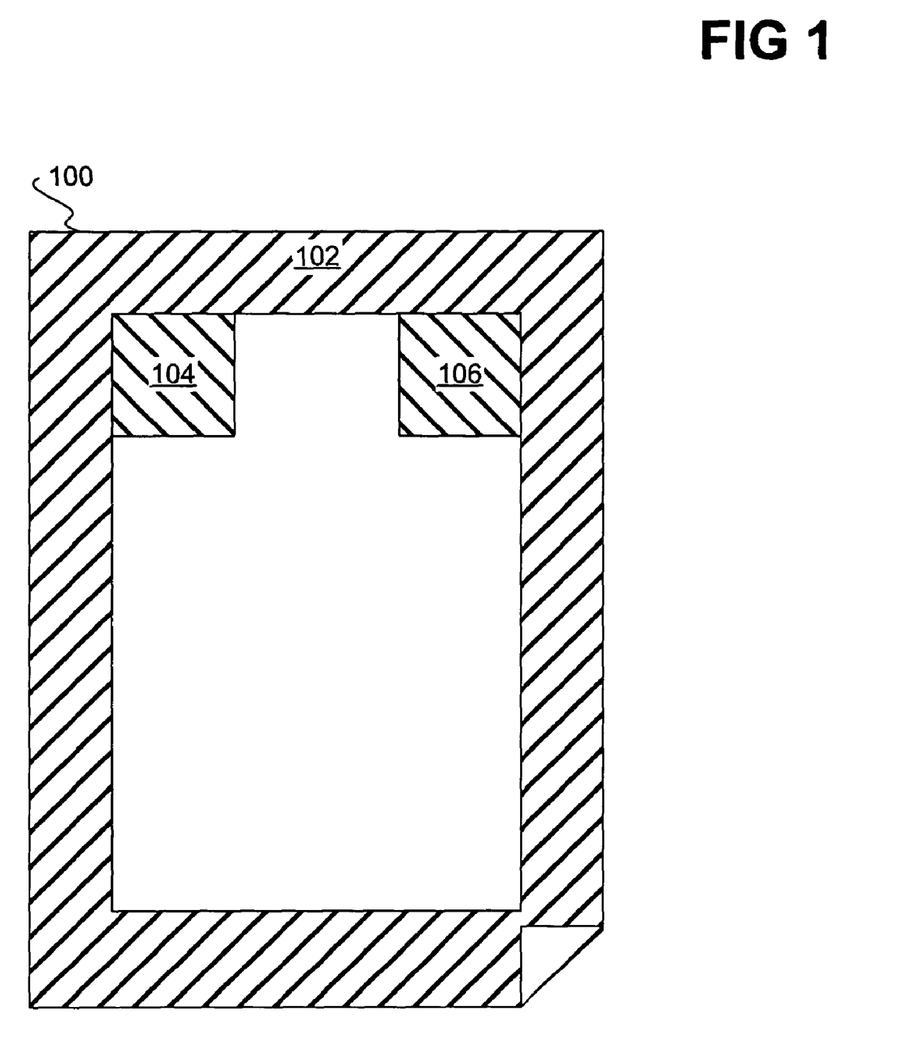
FIG. 1 is a diagram of a representative media having example color calibration targets printed using different color printing technologies, according to an embodiment of the invention.

FIG. 1 shows a representative media 100 on which two different color printing technologies have printed, according to an embodiment of the invention. The example color border area 102 has been printed with one color printing technology, whereas the example color patches 104 and 106 have been printed with another color printing technology. For consistent reference throughout the detailed description and the claims, the color printing technology that is used to output the patches 104 and 106 is referred to as the first color printing technology, whereas the color printing technology that is used to output the border area 102 is referred to as the second color printing technology.

The first color printing technology is different than the second color printing technology. The first color printing technology may be a process color printing technology that achieves desired colors by combining base colors, such as cyan, magenta, yellow, and optionally black, in accordance with a cyan-magenta-yellow-black (CMYK) color model. Such process color printing technologies may be digital technologies in that the output of the different base colorants, such as base color inks, to yield specific colors is accomplished digitally. For instance, devices that have digital computing capabilities, such as host computing devices like desktop and laptop computers, as well as image-formation devices, such as color inkjet-printing devices and color laser-printing devices, may be used. Other devices that have such digital capabilities are digital printing presses, or digital presses, in which a number of process colors, such as cyan, magenta, yellow, and optionally black, are used in varying degrees of combination to yield desired colors.

By comparison, the second color printing technology may be a spot color printing technology in which a single colorant, such as a single ink, has the desired color, and no combining of base colors is needed. Such spot color printing technologies may be analog technologies in which a particular spot color is selected, and then is used to print in a single pass. An example of a spot color printing technology is an offset printing press, in which a template corresponding to that which is desired to be printed is coated with the spot color ink, and then pressed, or offset, against the media. Such offset printing devices are commonly found in print shops, for instance. This type of spot color printing technology is an analog technology in that a device having digital computing capabilities is not needed to print onto media.

An embodiment of the invention works in conjunction with the media 100 of FIG. 1 as follows. First, the border area 102 is printed using the second printing technology. Next, preferably a matching color for the first printing technology is determined without actually printing onto the media 100 using the first printing technology. For example, where the border area 102 is a particular spot color, there may be an existing database that suggests the combination of base colors to yield a process color that is likely to match the spot color. The color patch 104 is then printed using the first printing technology with this process color. At least parts of both the border area 102 and the color patch 104, as well as of the color patch 106, are referred to as color calibration targets, in that they are then used to more specifically match the color patches 104 and 106 using the first color printing technology to the border area 102 using the second color printing technology.

Even though the color of the patch 104 should match the color of the border area 102, it may not. This may be because of any of a number of factors. The first color printing technology or the second color printing technology may output onto the media 100 differently than expected. This may especially be the case where the media 100 is not common paper, but a special type of media, such as glossy paper, cardboard, transparencies, and so on. Environmental conditions that exist when the different color printing technologies are used may affect the colors of the border area 102 or the patch 104. The devices themselves and the inks or colorants that are used to print the border area 102 and the patch 104 may be out-of-specification, and thus result in the color of the patch 104 not matching the color of the border area 102.

Therefore, the color differences between the color patch 104 and the border area 102 are determined. A specific approach to determine these color differences is described in a subsequent section of the detailed description. Based on these color differences, the first printing technology is calibrated so that subsequent output of the color of the patch 104 using the first printing technology better matches the color of the border area 102. A specific approach to color calibration is also described in a subsequent section of the detailed description. The color of the border area 102 may exceed the color gamut, or range of colors, that is possible with the first printing technology, as can occur where the border area 102 is printed using spot color printing technology and the patch 104 is printed using process color printing technology. Therefore, alternative colors that most closely match or that are complementary to the color of the border area 102 may be suggested for selection by the user.

To verify that the first color printing technology as has been color calibrated yields output that better matches the border area 102 printed using the second color printing technology, a second patch 106 may be printed using the first color printing technology. If the second patch 106 still does not match the border area 102, such as by more than a threshold, or to user satisfaction, then the process that has been described with respect to the patch 104 may be repeated for the second patch 106. That is, the color differences between the border area 102 and the patch 106 may be determined, and the first color printing technology recalibrated based on these color differences. This process of printing color calibration targets by the first printing technology until the color matches the color calibration target printed by the second printing technology can be iteratively repeated until the first printing technology has been satisfactorily calibrated.

Method for Color Matching Different Color Printing Technologies

Figure 2:
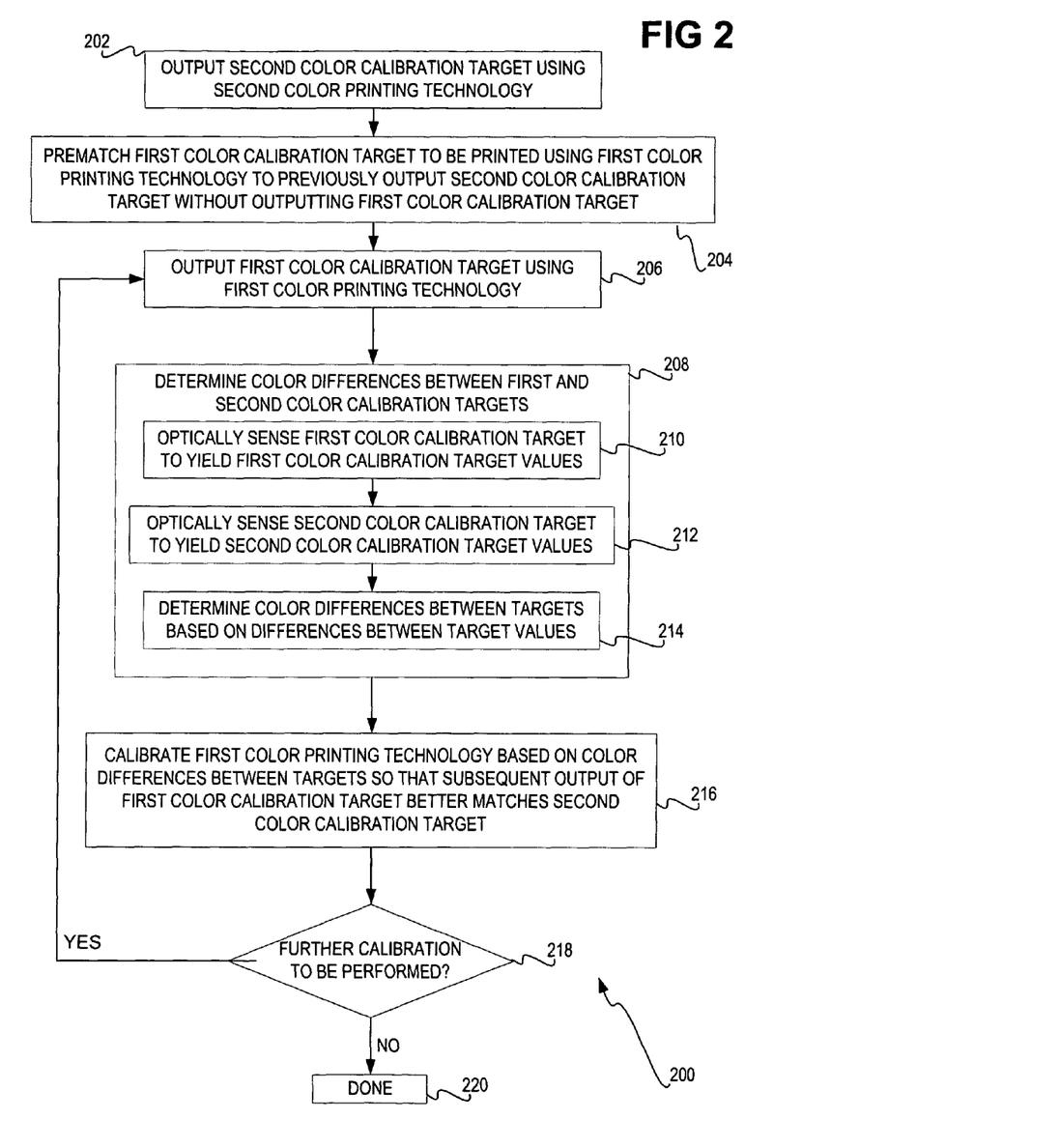
FIG. 2 is a flowchart of a method for color matching different color printing technologies, according to an embodiment of the invention.

FIG. 2 shows a method 200 for color matching different color printing technologies, according to an embodiment of the invention. The method 200, as is the case for other methods of embodiments of the invention, may be implemented as a computer program stored on a computer-readable medium. The medium may be a volatile or a non-volatile medium. The medium may also be semiconductor medium, such as a semiconductor memory like flash memory or dynamic random-access memory (DRAM), an optical medium, such as a compact disc (CD)-type medium or a digital versatile disc (DVD)-type medium, and/or a magnetic medium, such as a hard disk drive, a floppy disk, or a tape cartridge.

A second color calibration target is initially output onto media using a second color printing technology (202). The second color calibration target has a specific color that results from using one or more colorants, such as inks, by the second color printing technology. The terminology color calibration target refers to an area on the media printed by a color printing technology in a given color. The target may be a sample printed specifically for the purposes of color matching, or may be a part of an image or design intended to be printed on the media. The initial outputting of the second color calibration target onto the media means that the second target is preprinted onto the media before the first color calibration target is printed on the media.

A first color calibration target to be printed, or output, on the media using a first color printing technology is optionally pre-matched to the second color calibration target, without actually outputting the first color calibration target (204). For instance, a database may be employed to determine a color that the first color printing technology that is believed to match the color of the second color calibration target. Alternatively, an optical sensing mechanism can be used to measure the color value of the second color calibration target and determine an appropriate color for the first color calibration target to be output by the first color printing technology.

The first color calibration target is then output, using the first color printing technology (206). The first color calibration target also has a specific color that results from using one or more colorants, such as inks, by the first color printing technology. Next, the color differences between the first and the second color calibration targets are determined (208). The differences in the colors between the two color calibration targets are subsequently used to calibrate the first color printing technology, so that the color of the first color calibration target as subsequently may be output better matches the color of the second color calibration target.

In one embodiment, the color differences between the color calibration targets are determined by performing 210, 212, and 214. The first color calibration target is optically sensed to yield, or measure, first color calibration target values (210). For instance, an optical sensor may be used to measure color component values of the first color calibration target. These color component values may be the values having a particular bit depth for each of the color components of a color space of the optical sensor. For instance, the color space of the optical sensor may be the red-green-blue (RGB) color space. The values may then be converted to the color space of the first color printing technology, such as the cyan-magenta-yellow-black (CMYK) color space.

Similarly, the second color calibration target is optically sensed to yield, or measure, second color calibration target values (212). An optical sensor may also be used to measure the color component values of the second color calibration target. The color component values may be for the color components of the color space of the optical sensor, which are again converted to the color space of the first color printing technology. In this way, the color differences between the calibration targets can be determined, based on the differences between the target values (214). For instance, the color component values of the second target may be the desired values that the color component values of the first target should attain.

The first color printing technology is calibrated based on the color differences between the first and the second color calibration targets, so that subsequent output of the first color calibration target better matches the second color calibration target (216). In one embodiment, this is accomplished by constructing a color map for each color component of the color space of the first color printing technology, based on the actual color output by the technology, as represented by the first target, and the desired color output, as represented by the second target. A color map is also referred to as a color lookup table, a color index map, or a color palette. Based on a desired color to be output by the first color printing technology, the color map provides the amount of each of the base inks to be output to most closely achieve this desired color. Calibration is used in 216 because the initial pre-matching performed in 204 may not account for variations in the specific first color printing technology device being used, nor the specific inks or other colorants being used by this device. The color maps are constructed to thus compensate for the color differences between the first and the second targets.

Next, the method 200 determines whether further calibration is to be performed (218). For instance, in one embodiment, if the first color calibration target values measured in 210 are within a certain percentage, or threshold, of the second color target values measured in 212, then the method 200 concludes that the first target matches the second target by more or less than the threshold, and the method 200 is finished (220). That is, the method 200 may conclude that the color differences between the first and the second targets are less than a threshold. As another example, in another embodiment, the user is requested to determine whether he or she is satisfied with the first color calibration target matching the second color calibration target. If so, then the method is also finished (220). If further calibration is to be performed, then 206, 208, and 216 are repeated as has been described, for another first color calibration target reflecting the calibration that has been most recently performed in 216. This iterative process continues until it has been determined that no further calibration is to be performed.

Figure 3:
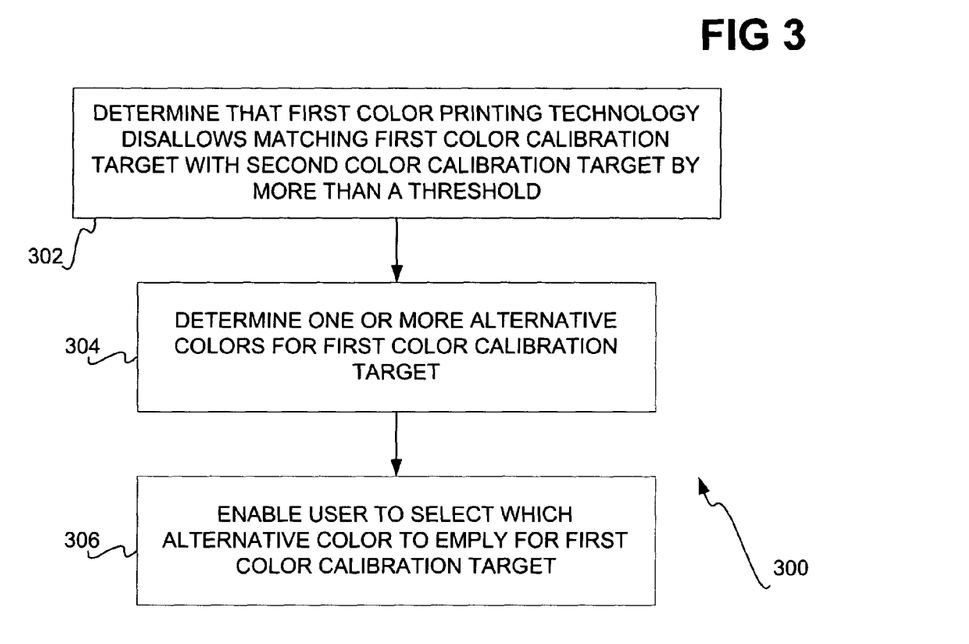
FIG. 3 is a flowchart of a method for enabling a user to select alternative colors where the color calibration target of one color printing technology exceeds the color gamut of another color printing technology, according to an embodiment of the invention.

FIG. 3 shows a method 300 for determining whether further color calibration of the first color printing technology is to be performed in 218 of FIG. 2, according to another embodiment of the invention. The method 300 may specifically be performed where the second color calibration target has a spot color, which may or may not be able to be duplicated by the first color printing technology, where the first color printing technology is a combinatory, process color printing technology. For example, the second target may have been printed by an offset color printing technology, whereas the first target may be printed by a digital color printing technology, such as an inkjet or a laser printing device.

First, the method 300 determines that the first color printing technology does not allow matching of the first color calibration target with the second color calibration target by more than a threshold, such as a percentage (302). For example, the optical sensing device used in 210 and 212 may have a greater bit depth than the bit depth of the first color printing technology. This means that the optical sensing device is able to detect more colors than can be reproduced by the first color printing technology. If the optical sensing device detects that the second calibration target has a color that is not within the color gamut, or color range, of the first color printing technology, then precise matching of the first and the second targets may not be possible.

The optical sensing device may detect, for example, that the second color calibration target has a magenta color value of x, where the first color printing technology can only duplicate magenta color values as close as x+y or x−y. If y/x exceeds a percentage threshold, then the method 300 may determine that the first color printing technology does not allow matching of the second color calibration target. If the optical sensing device has a bit depth of n, this means that it is able to detect $2^n$ shades of each color component. If the first color printing technology has a bit depth of m<n, then it is able to generate $2^m < 2^n$ shades of each color component. The optical sensing device may thus detect the second color calibration target as having a color value that cannot be reproduced by the first color printing technology.

Therefore, the method 300 determines one or more alternative colors for the first color calibration target (304). In the previous example, for instance, the method 300 may generate alternatives that include using x+y and/or x−y for the magenta color value of the color of the first color calibration target. That is, the closest colors that the first color printing technology can output are determined. Furthermore, complementary colors to the color of the second color calibration target that the first color printing technology can output may also be determined. The user is thus permitted to select which alternative color to employ for the first color calibration target (306). Although a precise or substantially precise match between the first and the second targets may not be achieved, the user nevertheless is able to select which color to use for the first target to best match or complement the second target.

System, Host Computing Device, and Image-Formation Device

Figure 4:
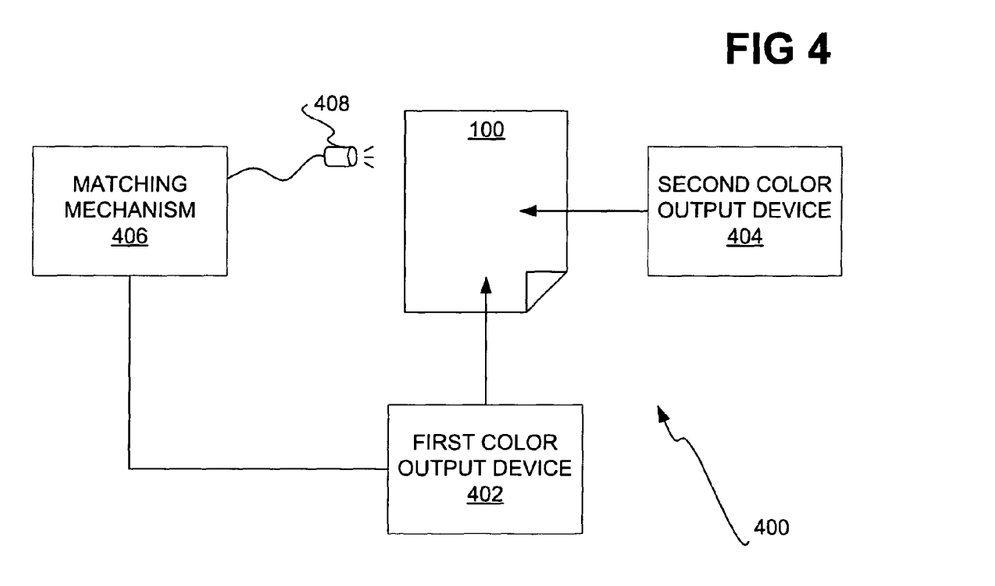
FIG. 4 is a diagram of a system, according to an embodiment of the invention.

FIG. 4 shows a system 400, according to an embodiment of the invention. The system 400 includes a first color output device 402, a second color output device 404, a matching mechanism 406, and a sensing mechanism 408. The first color output device 402 employs a different color printing technology than the second color output device 404. Each of the color output devices 402 and 404 is capable of outputting colors. For instance, one of the color output devices 402 and 404 may be able to output colors combined from base colors, whereas the other device may be able to output spot colors without having to combine base colors. The second color output device 404 outputs a color calibration target onto the media 100, and then the first color output device 402 outputs a color calibration target onto the media 100 that is to match the color of the target output by the device 404.

The matching mechanism 406 employs the sensing mechanism 408 to calibrate the first color output device 402 so that the colors output thereby better match the colors that have been output by the second color output device 404. The matching mechanism 406 performs this color calibration based on the measurements of the colors by the sensing mechanism 408. The sensing mechanism 408 may be an optical sensor, or another type of sensing mechanism. As depicted in FIG. 4, the sensing mechanism 408 is an external mechanism communicatively connected to the matching mechanism 406. Alternatively, however, the optical sensor may be a part of the matching mechanism 406, or of the first color output device 402.

The matching mechanism 406 may include a computer program, as well as a host computing device communicatively connected to the first color output device 402, where the computer program is executed by the host computing device. The host computing device may be, for instance, a desktop or a laptop computer. Alternatively, the matching mechanism 406 may be a part of the first color output device 402, such that the computer program of the matching mechanism 406 is executed by the first color output device 402. The computer program is able to perform the methods of embodiments of the invention that have been described in the previous section of the detailed description.

Figure 5:
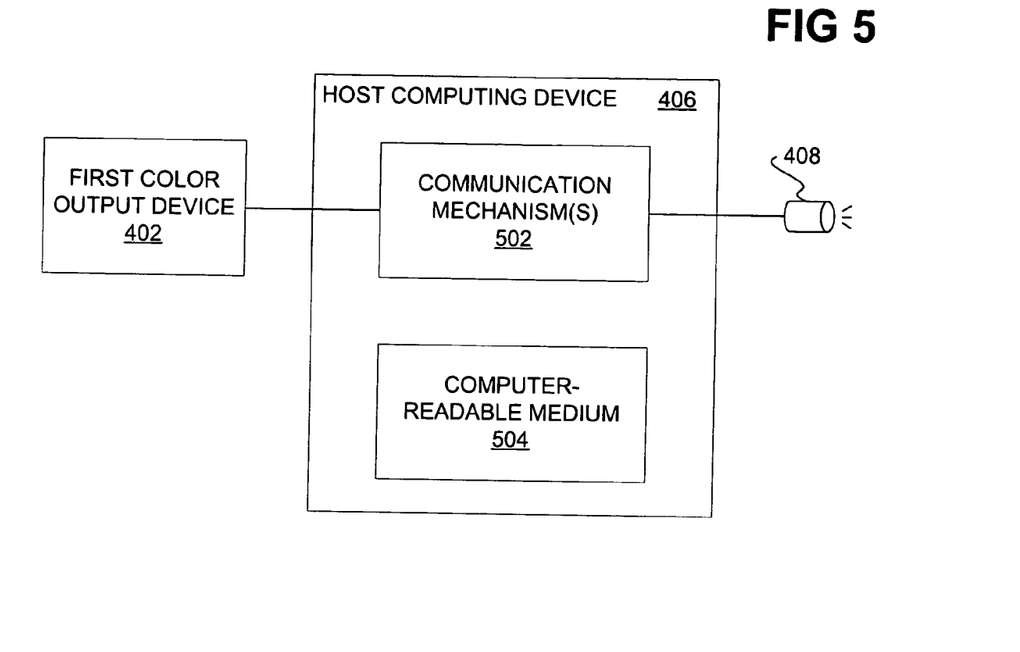
FIG. 5 is a block diagram of a host computing device that may be used in conjunction with the system of FIG. 4, according to an embodiment of the invention.

FIG. 5 shows the matching mechanism 406 of FIG. 4 as a host computing device, according to a specific embodiment of the invention. The host computing device includes one or more communication mechanisms 502, as well as a computer-readable medium 504. The host computing device may also include other components in addition to and/or in lieu of those shown in FIG. 5. The communication mechanisms 502 enable the host computing device to communicatively connect with, in a wired or wireless manner, the first color output device 402 and the sensing mechanism 408. The communication mechanisms 502 may be or include serial or parallel ports, wireless transmitters, receivers, or transceivers, as well as other types of communication mechanism. In one embodiment, the sensing mechanism 408 may be a part of the host computing device.

The computer-readable medium 504 has a computer program stored thereon to calibrate the first color output device 402, so that the colors output thereby better match the colors output by the second color output device 404 of FIG. 4. More generally, the computer program calibrates a color printing technology so that it outputs colors onto the media 100 that better match the colors output by another color printing technology, based on measurements by the sensing mechanism 408. The medium 504 may be a volatile or a non-volatile medium, and may be a semiconductor, optical, and/or magnetic medium.

Figure 6:
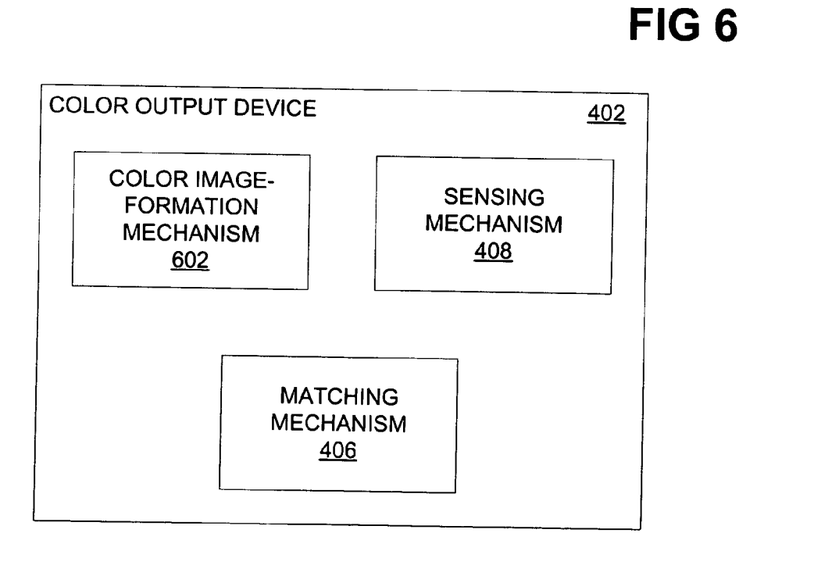
FIG. 6 is a block diagram of an image-formation device, such as a printing device, that may be used in conjunction with the system of FIG. 4, according to an embodiment of the invention.

FIG. 6 shows the first color output device 402 of FIG. 4, according to a specific embodiment of the invention. The color output device 402 is specifically depicted as an image-formation device, which is a device that is able to form images onto media, such as a printing device like an inkjet-printing device or a laser-printing device. The color output device 402 includes in the embodiment of FIG. 6 a color image-formation mechanism 602, the matching mechanism 406, and the sensing mechanism 408. The color output device 402 may also include other components in addition to and/or in lieu of those depicted in FIG. 6.

The color image-formation mechanism 602 is specifically the mechanism that forms images onto media. Where the color output device 402 is an inkjet-printing device, the mechanism 602 is an inkjet-printing mechanism. Similarly, where the color output device 402 is a laser-printing device, the mechanism 602 is a laser-printing mechanism. The sensing mechanism 408 measures the colors output by the color image-formation mechanism 602, as well as the colors output by another color image-formation device that employs different color printing technology than the mechanism 602, such as the second color output device 404 of FIG. 4. The matching mechanism 406 calibrates the color image-formation mechanism 602 so that the colors it outputs better match the colors output by the other color image-formation device, based on the measurements taken by the sensing mechanism 408.

CONCLUSION

It is noted that, although specific embodiments have been illustrated and described herein, it will be appreciated by those of ordinary skill in the art that any arrangement that is calculated to achieve the same purpose may be substituted for the specific embodiments shown. Other applications and uses of embodiments of the invention, besides those described herein, are amenable to at least some embodiments. This application is intended to cover any adaptations or variations of the present invention. Therefore, it is manifestly intended that this invention be limited only by the claims and equivalents thereof.

We claim:

1. A method comprising:
   outputting a first color calibration target using a first color printing technology onto media having a second color calibration target already output thereon using a second color printing technology;
   determining color differences between the first color calibration target and the second color calibration target; and,
   calibrating the first color printing technology based on the color differences between the first color calibration target and the second color calibration target.

2. The method of claim 1, wherein calibrating the first color printing technology based on the color differences between the first and the second color calibration targets allows for subsequent output of the first color calibration target to better match the second color calibration target.

3. The method of claim 1, further comprising initially outputting the second color calibration target onto the media using the second color printing technology.

4. The method of claim 1, further comprising initially pre-matching the first color calibration target to the second color calibration target without outputting the first color calibration target onto the media.

5. The method of claim 1, further comprising iteratively repeating a number of times outputting the first color calibration target, determining the color differences between the first color calibration target and the second color calibration target, and calibrating the first color printing technology based on the color differences, until the color differences are less than a threshold.

6. The method of claim 1, further comprising iteratively repeating a number of times outputting the first color calibration target, determining the color differences between the first color calibration target and the second color calibration target, and calibrating the first color printing technology based on the color differences, until a user is satisfied with the first color calibration target matching the second color calibration target.

7. The method of claim 1, wherein outputting the first color calibration target using the first color printing technology onto the media comprises outputting the first color calibration target using the first color printing technology onto the media having the second color calibration target preprinted thereon using the second color printing technology.

8. The method of claim 1, wherein the first color printing technology is an inkjet-color printing technology and the second color printing technology is an offset-color printing technology.

9. The method of claim 1, wherein the first color printing technology is a process color-printing technology, and the second color printing technology is a spot color-printing technology.

10. The method of claim 1, wherein determining the color differences between the first color calibration target and the second color calibration target comprises:
    optically sensing the first color calibration target to yield first color calibration target values;
    optically sensing the second color calibration target to yield second color calibration target values; and,
    determining the color differences between the first color calibration target and the second color calibration target based on differences between the first color calibration target values and the second color calibration target values.

11. The method of claim 1, wherein calibrating the first color printing technology so that subsequent output of the first color calibration target better matches the second color calibration target comprises constructing one or more color maps for the first color printing technology to compensate for the color differences between the first color calibration target and the second color calibration target.

12. The method of claim 1, wherein calibrating the first color printing technology so that subsequent out put of the first color calibration target better matches the second color calibration target comprises matching the first color calibration target with the second color calibration target by more than a threshold.

13. The method of claim 1, wherein calibrating the first color printing technology so that subsequent output of the first color calibration target better matches the second color calibration target comprises:
    determining that the first color printing technology disallows matching the first color calibration target with the second color calibration target by more than a threshold;
    determining one or more alternative colors for the first color calibration target; and,
    enabling a user to select which of the one or more alternative colors to employ for the first color calibration target.

14. A computer-readable medium having a computer program stored thereon to perform a method comprising:
    outputting a process color calibration target using a process color printing technology onto media having a spot color calibration target already output thereon using a spot color printing technology;
    determining color differences between the process color calibration target and the spot color calibration target; and,
    calibrating the process color printing technology based on the color differences between the process color calibration target and the spot color calibration target.

15. The medium of claim 14, wherein the method further comprising iteratively repeating a number of times outputting the process color calibration target, determining the color differences between the process color calibration target and the spot color calibration target, and calibrating the process color printing technology based on the color differences.

16. The medium of claim 14, wherein the process color printing technology is a multiple-pass cyan-magenta-yellow-black (CMYK) color printing technology in which cyan, magenta, yellow, and black are combined to yield specific colors.

17. The medium of claim 14, wherein a color gamut of the process color printing technology does not encompass the spot color calibration target, such that calibrating the process color printing technology comprises determining one or more alternative colors for the process color calibration target.

18. A system comprising:
    a color output device capable of outputting colors combined from base colors onto media as a first color calibration target;
    a sensing mechanism to measure the colors output by the color output device onto the media as the first color calibration target and to measure colors already output by another color output device employing different technology than the color output device, onto the media as a second color calibration target; and,
    a matching mechanism to calibrate the color output device so that the colors output by the color output device onto media better match the colors previously output by the other color output device onto the media, based on measurements of the colors by the sensing mechanism.

19. The system of claim 18, further comprising the other color output device.

20. The system of claim 18, wherein the other color output device is capable of outputting spot colors without having to combine base colors.

21. The system of claim 18, wherein the color output device is a digital press device and the other color output device is an analog press device.

22. The system of claim 18, wherein the color output device is an inkjet-printing device.

23. The system of claim 18, wherein the base colors combined by the color output device comprise at least cyan, magenta, and yellow.

24. The system of claim 18, wherein the sensing mechanism comprises an optical sensor.

25. The system of claim 24, wherein the optical sensor is part of the color output device.

26. The system of claim 24, wherein the optical sensor is an external device communicatively connected to the matching mechanism.

27. The system of claim 18, wherein the matching mechanism comprises a computer program.

28. The system of claim 27, wherein the matching mechanism comprises a host computing device communicatively connected to the color output device and by which the computer program is executed.

29. The system of claim 27, wherein the computer program is executed by the color output device.

30. A system comprising:
a combinatory color output device capable of outputting colors combined from base colors onto media as a first color calibration target; and,
means for calibrating the combinatory color output device so that the colors output by the combinatory color output device onto the media better match colors previously and already output by a spot color output device onto the media as a second color calibration target.

31. The system of claim 30, wherein the combinatory color output device is a digital press device and the spot color output device is an analog press device.

32. The system of claim 30, wherein the combinatory color output device is an inkjet-printing device that is capable of outputting the colors by combining at least the base colors cyan, magenta, and yellow.

33. The system of claim 30, wherein the means is further for measuring the colors output by the combinatory color output device and the colors output by the spot color output device, such that the means is for calibrating the combinatory color output device based on measurements of the colors.

34. A color image-formation device comprising:
a color image-formation mechanism capable of outputting colors onto media as a first color calibration target;
a sensing mechanism to measure the colors output by the color image-formation mechanism and to measure colors already output by another color, image-formation device onto the media as a second color calibration target and employing different technology than the color image-formation mechanism; and,
a matching mechanism to calibrate the color image-formation mechanism so that the colors output by the color image-formation mechanism onto the media better match the colors output by the other color image-formation device, based on measurements of the colors by the sensing mechanism.

35. The color image-formation device of claim 34, wherein the color image-formation mechanism is capable of outputting the colors by combining base colors.

36. The color image-formation device of claim 35, wherein the base colors comprise cyan, magenta, yellow, and black.

37. The color image-formation device of claim 34, wherein the color image-formation mechanism is an inkjet-printing mechanism, and the color image-formation device is an inkjet-printing device.

38. A computing device:
a communicative mechanism receptive to communicative connection with a sensing mechanism that is capable of measuring colors output as different color calibration targets onto a same media using different color printing technologies; and,
a computer-readable medium having a computer program stored thereon to calibrate one of the different color printing technologies so that the colors output thereby onto the media better match the colors already and previously output by the other of the different color printing technologies, based on measurements of the colors by the sensing mechanism.

39. The computing device of claim 38, further comprising the sensing mechanism.

40. The computing device of claim 38, wherein the different color printing technologies comprise a digital press technology and an analog press technology.

41. The computing device of claim 38, wherein the different color printing technologies comprise a process color printing technology and a spot color printing technology.

42. The computing device of claim 38, wherein the different color printing technologies comprise an inkjet color printing technology and an offset color printing technology.

* * * * *